US008401520B2

(12) United States Patent
Govindachari et al.

(10) Patent No.: US 8,401,520 B2
(45) Date of Patent: Mar. 19, 2013

(54) METHOD AND APPARATUS FOR MULTITERMINAL SUPPORT USING BLUETOOTH BASED AUDIO GATEWAY

(75) Inventors: Raghunath Govindachari, Bangalore (IN); Santosh Shivadatta, Karnataka (IN); Shubhankar Saha, Kolkata (IN)

(73) Assignee: MindTree Limited, Bangalore (IN)

( * ) Notice: Subject to any disclaimer, the term of this patent is extended or adjusted under 35 U.S.C. 154(b) by 842 days.

(21) Appl. No.: 12/011,556

(22) Filed: Jan. 28, 2008

(65) Prior Publication Data

US 2009/0061822 A1 Mar. 5, 2009

(30) Foreign Application Priority Data

Aug. 30, 2007 (IN) .......................... 1947/CHE/2007

(51) Int. Cl.
*H04M 3/16* (2006.01)
*H04M 3/42* (2006.01)
*H04B 7/00* (2006.01)
(52) U.S. Cl. ................. 455/411; 455/416; 455/518
(58) Field of Classification Search ............ 455/411
See application file for complete search history.

(56) References Cited

U.S. PATENT DOCUMENTS

| 6,490,443 | B1 | 12/2002 | Freeny, Jr. ............... 455/406 |
|---|---|---|---|
| 2002/0193073 | A1 | 12/2002 | Fujioka .................... 705/41.1 |
| 2003/0044654 | A1* | 3/2003 | Holt ......................... 429/13 |
| 2005/0282589 | A1 | 12/2005 | Barneah .................. 455/569.1 |
| 2006/0126561 | A1 | 6/2006 | Jose ......................... 370/330 |
| 2006/0178160 | A1* | 8/2006 | Hans et al. ............... 455/518 |
| 2006/0203083 | A1* | 9/2006 | Wilson et al. ........... 348/14.02 |
| 2007/0127670 | A1* | 6/2007 | Morishima et al. ...... 379/202.01 |
| 2007/0178874 | A1* | 8/2007 | Matsuyama .............. 455/343.1 |
| 2008/0057990 | A1* | 3/2008 | Fuccello et al. .......... 455/507 |

\* cited by examiner

*Primary Examiner* — Lester Kincaid
*Assistant Examiner* — Andy Gu
(74) *Attorney, Agent, or Firm* — Ash Tankha; Lipton, Weinberger & Husick

(57) ABSTRACT

Disclosed herein is a method and system for establishing a local conferencing session amongst a plurality of Bluetooth enabled terminal units. An audio gateway is provided to interconnect a voice network and the terminal units. A session management entity is provided on the audio gateway and each of the terminal units. A local conferencing session setup is established prior to the conference session wherein a set of common session parameters is shared among the audio gateway and the terminal units through the respective session management entities. The common session parameters enable Bluetooth communication between the audio gateway and the terminal units. The audio gateway broadcasts the voice packets from the voice network to the terminal units. The audio gateway provides microphone holder rights to a terminal unit to transfer voice packets to the voice network. Further, the audio gateway coordinates the transfer of microphone rights between the terminal units.

25 Claims, 4 Drawing Sheets

METHOD AND APPARATUS FOR MULTITERMINAL SUPPORT USING BLUETOOTH BASED AUDIO GATEWAY

CROSS REFERENCE TO RELATED APPLICATIONS

This application claims the benefit of non-provisional patent application number 1947/CHE/2007 titled "Method and Apparatus For Multiterminal Support Using Bluetooth Based Audio Gateway", filed on Aug. 30, 2007 in the Indian Patent Office.

The specification of the above referenced patent application is incorporated herein by reference in its entirety.

BACKGROUND

This invention in general relates to wireless communications and specifically relates to a method and system for audio conferencing amongst a plurality of Bluetooth enabled terminal units using a Bluetooth enabled audio gateway.

Typically in the current art of Bluetooth communication, a limited number of devices may communicate with each other synchronously. The current implementation of the Bluetooth standards allows a Bluetooth device to interconnect with up to seven devices. However, there may be situations where the Bluetooth standards need to support communication amongst a plurality of Bluetooth devices. Exemplarily, consider a family or a group of friends desiring to communicate with each other in a public place like an airport or a hotel lounge. The family or the group of friends may want to participate in a cellular network based call using their Bluetooth headsets instead of using the speaker phone of the mobile handset. The alternative of using individual handsets to join the group call over a cellular network may be both inconvenient and expensive. As another example consider an office environment where tens of participants may need to participate in a single audio conferencing session using Bluetooth communication. Though Bluetooth communication devices may be convenient and useful in such situations, the current methods of Bluetooth communication may not effectively support such a scale of participation.

The Bluetooth standard specifies multiple types of Bluetooth bearer channels such as synchronous connection oriented (SCO) channel, extended synchronous connection oriented (eSCO) channel, etc for transporting voice between a master Bluetooth device and a slave Bluetooth device. However, these transport mechanisms may not efficiently support broadcasting the voice data to multiple slave devices. Existing methods of Bluetooth communication may not permit broadcasting of synchronous audio data to multiple slave devices and may not be reliable in delivering voice data from one of the slave devices to the master device. For example, a Bluetooth piconet may allow a maximum of eight devices, to be addressable using the logical transport address (LT-ADDR) field of the Bluetooth packet headers.

Some of the existing methods of using Bluetooth communication amongst a plurality of participants rely on explicit repeaters that may consume bandwidth and may not be scalable to larger number of participants. To accommodate multiple terminals or slave devices in a conferencing session, the master device may have to space out the SCO/eSCO channels between distinct slave devices. In addition, the master device may have to buffer and repeat the voice samples from an external voice network in each of the synchronous channels. Similarly, the master device needs to mix or select the voice samples that may be coming over the Bluetooth link from one or more slave devices and send the voice samples out to the voice network. This method of explicitly multiplexing and demultiplexing multiple synchronous links may not be scalable. For example, using a 64 kbps bidirectional SCO link for each terminal will limit the theoretical maximum number of terminals to three. Practically the limit of the number of terminals may be just two, due to the bandwidth needed for control signaling.

Hence, there is an unmet need for a local conferencing system using Bluetooth enabled devices, and a method of communication between the plurality of Bluetooth enabled devices that is efficient, scalable and involves minimum bandwidth consumption.

SUMMARY OF THE INVENTION

Disclosed herein is a method and system for addressing the above stated needs. The method and system disclosed herein enables a local conferencing session between a plurality of Bluetooth enabled terminal units and a Bluetooth enabled audio gateway. The system comprises a plurality of Bluetooth enabled terminal units connected to a single Bluetooth enabled audio gateway in a conference, wherein the Bluetooth enabled audio gateway anchors the local conferencing call to a voice network. The disclosed invention provides an efficient and scalable solution to a local conferencing system using Bluetooth communication means.

An audio gateway is a Bluetooth enabled device connected to a voice network such as a public switched telephone network (PSTN) line, a Voice over Internet Protocol (VoIP), a cellular network, or a satellite network. Bluetooth communication means is enabled in the audio gateway to wirelessly interconnect the voice network to the Bluetooth enabled terminal units such as headsets, handsets, and speaker phone systems.

A session management entity is provided on each of the plurality of terminal units and the audio gateway for establishing, reconfiguring and coordinating speech between the plurality of Bluetooth enabled terminal units and the audio gateway. The session management entity of these devices coordinates speech by a distributed control mechanism. The session management entity of the audio gateway coordinates the microphone holder rights between the terminal units during a conference by monitoring requests for the microphone holder rights and transferring the microphone holder rights between the terminal units.

The present invention establishes a local conferencing session that is scalable to tens of participants. The method disclosed herein maintains a small subset of the terminal units in active state, while the rest of the terminal units listening into the audio gateway transmission slots are maintained in a park state. However, unlike the standard park state, the terminal units in the parked state will be listening to the SCO packets instead of going into sleep.

The present invention overcomes the limitation of Bluetooth standards of supporting transmission of voice packets to a limited number of Bluetooth enabled terminal units, and provides a local conferencing system for Bluetooth enabled devices with synchronous communication between the plurality of Bluetooth enabled terminal units.

BRIEF DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION OF THE DRAWINGS

Figure 1:
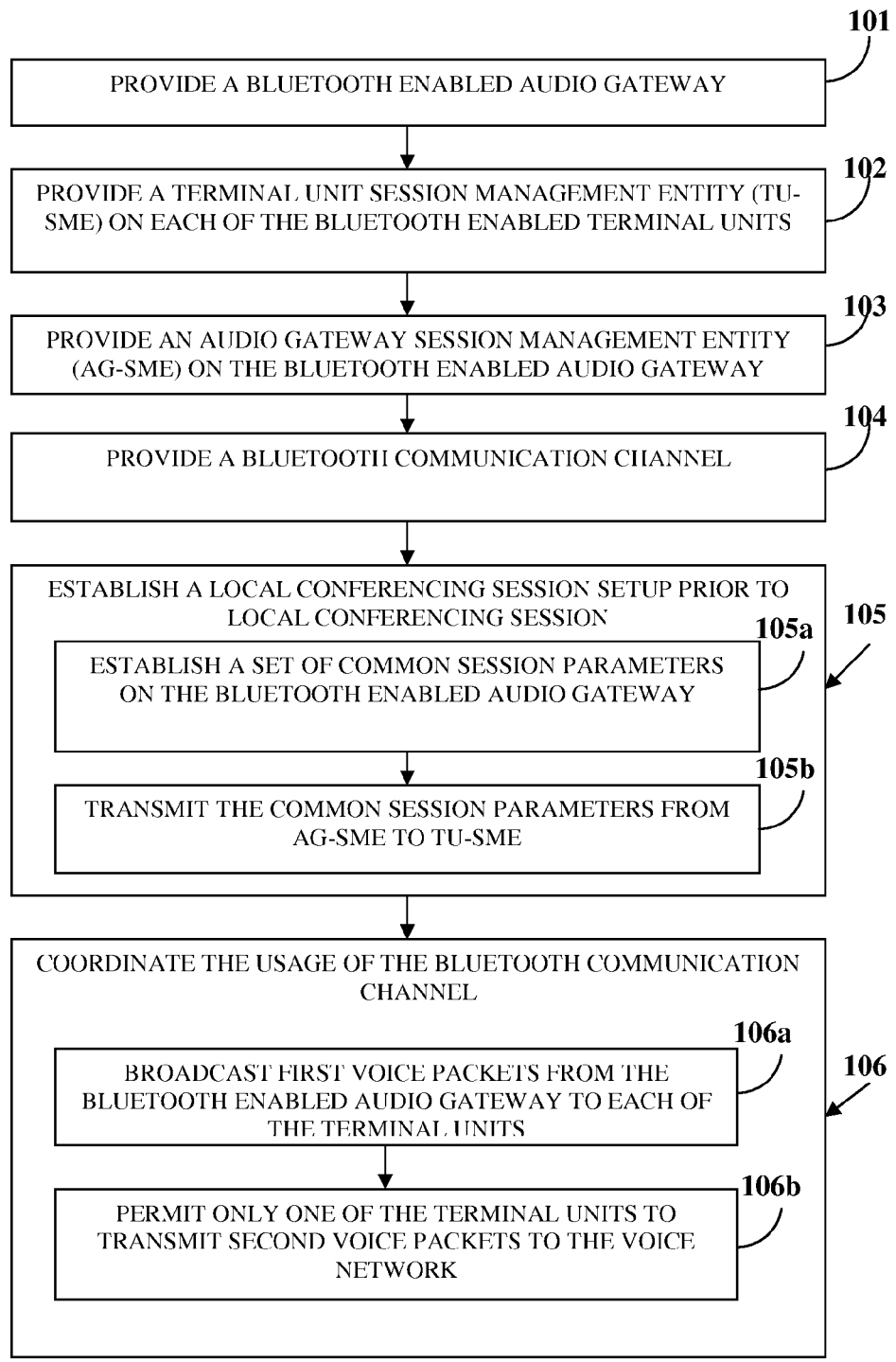
FIG. 1 illustrates the method of establishing a local conferencing session amongst a plurality of Bluetooth enabled terminal units.

FIG. 1 illustrates the method of establishing a local conferencing session amongst a plurality of Bluetooth enabled terminal units. The disclosed method enables communication between the plurality of Bluetooth enabled terminal units during the local conferencing session. A Bluetooth enabled audio gateway is provided 101 for transferring voice data between a voice network and the plurality of Bluetooth enabled terminal units. The audio gateway may initiate or receive calls from the voice network. A terminal unit session management entity (TU-SME) is provided 102 on each of the Bluetooth enabled terminal units. An audio gateway session management entity (AG-SME) is provided 103 on the Bluetooth enabled audio gateway. The TU-SMEs and the AG-SME may not be constrained by the Bluetooth communication protocols. A Bluetooth communication channel is established 104 for transmitting the voice packets between the audio gateway and the plurality of Bluetooth enabled terminal units. The transmission of voice packets further comprises the step of broadcasting the voice packets from the voice network to the Bluetooth enabled terminal units via the audio gateway.

Prior to initializing a local conferencing session amongst the Bluetooth enabled terminal units, a local conferencing session setup is established 105. In this setup, a set of common session parameters is shared among the audio gateway and the Bluetooth enabled terminal units. These common session parameters are established on the Bluetooth enabled audio gateway 105a and transmitted 105b from the audio gateway session management entity to the terminal unit session management entity of each of the plurality of Bluetooth enabled terminal units.

The common session parameters are required for broadcasting the voice packets from the Bluetooth enabled audio gateway to the Bluetooth enabled terminal units. Since local conferencing may be carried out in public places, use of encryption for voice packets is required. The Bluetooth protocols define procedures for a secure communication through prior authentication of the communication link between the audio gateway and the terminal units. Since the voice data is encrypted for privacy, a common key for encryption also forms part of the common session parameters. For a conferencing session, all the potential receivers, i.e., the terminal units and the audio gateway need to be aware of the common key. Further, a common personal identification number (PIN) is employed for authenticating the terminal units. This common PIN may be different from the individual PIN that a terminal unit or the audio gateway may use for a point to point connection.

The terminal units and the audio gateway may have different human-machine interface capabilities for entering the PIN. Terminal units such as headsets with no human-machine interface for changing the PINs may use fixed factory set four digit PINs. However, an audio gateway such as a cellular handset may have suitable human-machine interface for entering a PIN. Conversely, a Bluetooth cordless base station performing the functions of the audio gateway may not have the human-machine interface for entering a PIN, but terminal units such as handsets may have PIN entering facility. Therefore, a method for securely exchanging the common PIN among the local conferencing participants may be deployed over the Bluetooth links between the audio gateway and the terminal units.

Other common session parameters include definitions of the types of Bluetooth packets, clock offset, and duration for the synchronous channels used by the audio gateway and the terminal units. Bluetooth communication employs a slot based duplex communication and a multiple access arrangement. Synchronous channels reserve specific slots at fixed intervals for transmitting voice data deterministically. Thus, the parameters for synchronous data communication include the clock offset of the first slot and the length of the interval between two synchronous slots. In addition, the air modes used for encoding the voice payload are commonly defined and used during the local conference. The local conferencing setup further requires all the Bluetooth enabled terminal units to operate coherently using the same frequency hopping pseudorandom sequence, as defined by the Bluetooth standards. For example, if an adaptive frequency hopping scheme is used, then all the terminal units employ the same adaptive hopping sequence scheme, and not a mixed adaptive hopping sequence scheme.

The audio gateway coordinates 106 the usage of the Bluetooth communication channel amongst the Bluetooth enabled terminal units. The audio gateway delivers or broadcasts voice packets from the voice network to the terminal units 106a using the Bluetooth communication channel. While coordinating the usage of the Bluetooth communication channel 106, only one of the Bluetooth enabled terminal units is permitted to transmit voice packets to the voice network through the audio gateway 106b. A primary terminal unit is the first terminal unit that is connected to the audio gateway during the local conferencing session. The primary terminal unit, by default, acquires microphone holder rights from the audio gateway for transmitting voice packets to the voice network and becomes the incumbent terminal unit. All the subsequent terminal units that get connected to the audio gateway are referred to as secondary terminal units. The audio gateway may permit a secondary terminal unit to transmit speech in the conferencing session by transferring the microphone holder rights from an incumbent terminal unit to a requesting secondary terminal unit, whereby the requesting secondary terminal unit becomes the incumbent terminal unit after the microphone rights have been completely transferred.

The Bluetooth communication channel may be a synchronous channel or an asynchronous channel. The transmission of the voice packets to the Bluetooth enabled terminal units may be achieved through the synchronous channel. The synchronous channel may comprise a primary synchronous channel and a secondary synchronous channel. The primary synchronous channel is a wireless link between the audio gateway and the primary terminal unit or the incumbent terminal unit. The other participating terminal units are synchronized to the audio gateway transmission slots of the primary synchronous channel. The primary synchronous channel continually exists between the audio gateway and the primary terminal unit. The master-to-slave and slave-to-master packets transmitted over the primary synchronous channel are identified by the primary unit's logical transport address (LT-ADDR). The primary terminal unit or the incumbent terminal unit transmits voice packets to the audio gateway on the slave-to-master or unit-to-audio gateway transmission slots of the primary synchronous channel. The secondary synchronous channel is also established between the audio gateway and the primary terminal unit. All the terminal units are also synchronized on the slot trains of the secondary synchronous channel. However, the usage of the secondary synchronous channel may be limited to certain circumstances and time durations. For example, the secondary synchronous channel may be used for transmission of voice from a requesting terminal unit to the audio gateway while a transfer of microphone holder rights from an incumbent terminal unit to the requesting terminal unit is in progress. Using the secondary synchronous channel during the transfer of microphone holder rights is useful in applications requiring low latencies between the trigger for request and the beginning of voice transmission to the audio gateway.

In an alternative embodiment, instead of using synchronous channels, asynchronous channels may be used. Standard Bluetooth communication allows broadcast transmission of asynchronous packets to multiple recipients. Therefore, an Asynchronous Connectionless (ACL) channel may be used by imposing periodic transmission patterns. Since broadcast ACL transmission occurs in bursts of fixed number of repeated transmissions, the interval between two bursts may be fixed, leaving some slots for data transmission in the reverse direction. Similar to the conferencing system with synchronous channels, only the incumbent terminal unit may be allowed to respond back to the audio gateway. The audio gateway session management entity follows up the transmission burst by polling the incumbent terminal unit to facilitate reverse direction transmission.

Microphone holder rights enable the primary terminal unit or an incumbent terminal unit to transmit voice signals to the audio gateway through the primary synchronous channel. A request for microphone holder rights may be sent to the audio gateway session management entity (AG-SME) by the secondary terminal units. The request can either be triggered by a user initiated event or automatically, or the audio gateway may periodically solicit such a request from the secondary terminal unit session management entity. For example, the user of a secondary terminal unit may initiate a request for microphone holder rights through a user interface button. In an alternative embodiment, a terminal unit audio switch may be capable of detecting voice activity of the user and automatically trigger a request. In both the embodiments, the terminal unit session management entity (TU-SME) registers the request event in a terminal unit store (TU-STORE) and awaits a chance to send the request to the AG-SME. By acquiring microphone holder rights a secondary terminal unit becomes the incumbent terminal unit and transmits voice signals to the audio gateway through the primary synchronous channel. The microphone holder rights allow control over the primary synchronous channel. The steps involved in request and transfer of microphone holder rights are explained in greater detail in the description of FIG. 3.

Figure 2A:
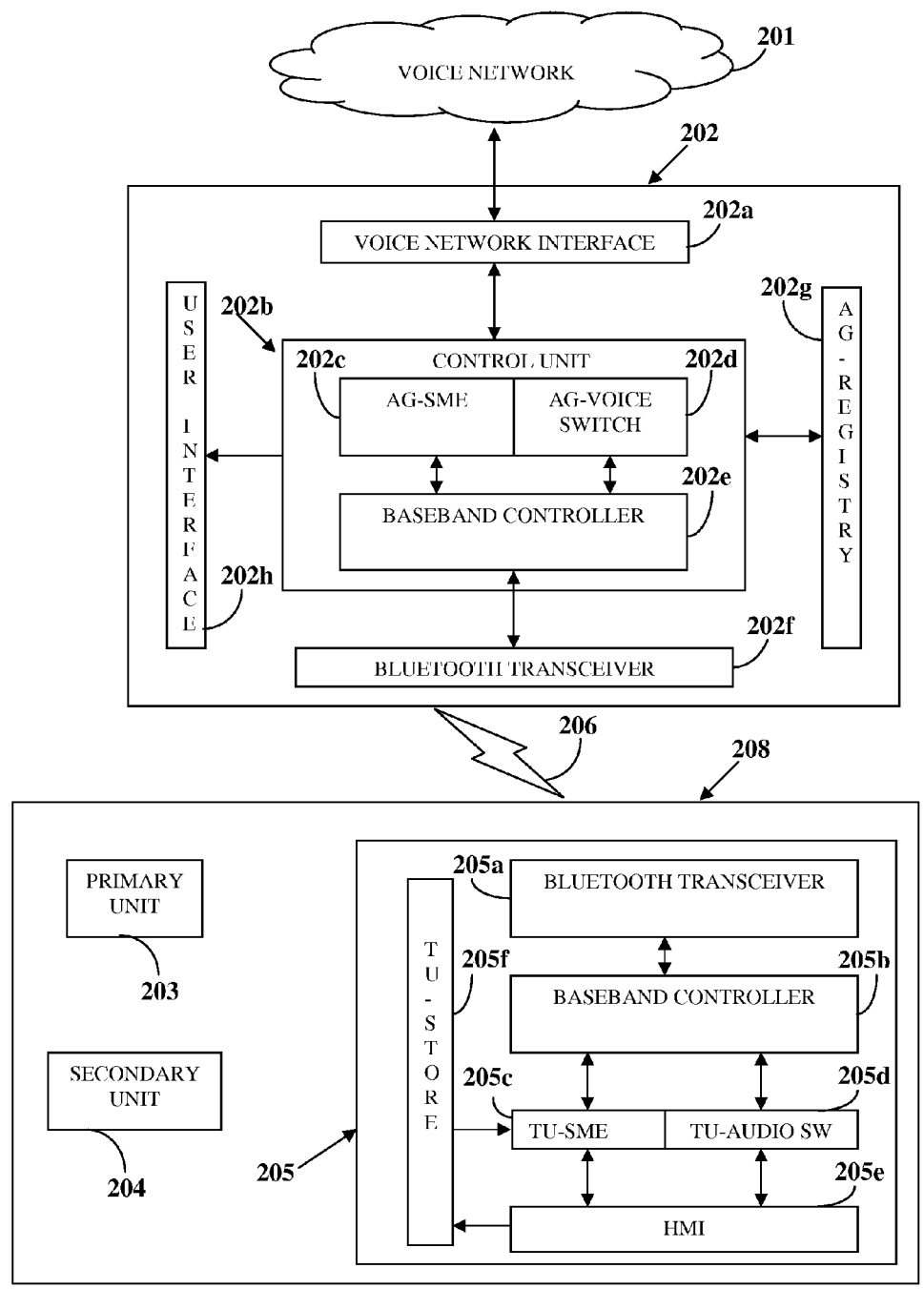
FIG. 2A exemplarily illustrates a system for local conferencing amongst a plurality of Bluetooth enabled terminal units.

FIG. 2A exemplarily illustrates a system for local conferencing amongst a plurality of Bluetooth enabled terminal units 203, 204, and 205. The system for conferencing comprises a voice network 201, a Bluetooth enabled audio gateway 202, and a plurality of Bluetooth enabled terminal units, including the primary terminal unit 203 and the secondary terminal units 204 and 205. The audio gateway 202 is connected to the voice network 201 and to one or more terminal units. The voice network 201 may be one of a public switched telephone network (PSTN) line, a Voice over Internet Protocol (VoIP), a cellular network, and a satellite network.

The audio gateway 202 may be a Bluetooth enabled master device that serves as a wireless interconnect between the voice network 201 and the Bluetooth enabled terminal units 203, 204, and 205. The audio gateway 202 is an intelligent system comprising a voice network interface 202a, a Bluetooth transceiver 202f that wirelessly connects the audio gateway 202 to one or more Bluetooth enabled terminal units, a control unit 202b that makes intelligent decisions critical to the operation of the conferencing system, and a user interface 202h.

The audio gateway 202 also consists of a registry 202g. The registry 202g is used to store the common session parameters and participant information of the plurality of Bluetooth enabled terminal units. The participant information comprises a record of the participating terminal units, number of participating terminal units determined after every defined time interval, the identity of the permitted or incumbent terminal unit, etc. The registry 202a is reset and the common session parameters are invalidated when a conferencing session is terminated.

The control unit of the audio gateway 202 comprises an audio gateway session management entity (AG-SME) 202c, an audio gateway voice switch 202d and a base band controller 202e. The AG-SME 202c is a distributed control mechanism used for establishing, reconfiguring and coordinating speech between the plurality of terminal units. The audio gateway voice switch 202d may be a simple wired interconnect, and may have additional capabilities of mixing, multiplexing, analyzing and detecting generation of voice band signals. The voice packets from the voice network interface 202a may be routed to the Bluetooth transceiver 202f by the intermediary audio gateway voice switch 202d. Further, the audio gateway voice switch 202d may be configured to enable or disable a specific participant's voice being mixed in the conference.

As an exemplary representation of the Bluetooth enabled terminal units 203, 204, and 205, the Bluetooth enabled terminal unit 205 comprises a terminal unit session management entity (TU-SME) 205c and a terminal unit audio switch 205d. The terminal unit session management entity 205c controls all functions of the terminal unit 205 and interacts with the AG-SME 202c of the audio gateway 202. The right to transmit on a primary synchronous channel 206 by a terminal unit is assigned and managed by the AG-SME 202c of the audio gateway 202. However, the adherence of each terminal unit to its respective assigned rights is locally administered by the TU-SME 205c of each terminal unit. The Bluetooth enabled terminal unit 205 further comprises a Bluetooth transceiver 205a, a base band controller 205b and a human-machine interface (HMI) 205e.

The HMI 205e of the Bluetooth enabled terminal unit 205 may comprise a voice and silence detector. In another form, the user interface 205e may comprise buttons and tone generators. In yet another form, the user interface 205e of the Bluetooth enabled terminal unit 205 may comprise buttons and light emitting diodes. The human-machine interface (HMI) 205e enables the user of the terminal unit 205 to request for microphone holder rights, initiate calls, etc.

The Bluetooth transceiver 202f of the audio gateway 202 and the Bluetooth transceiver 205a of the terminal unit 205 are capable of supporting data transport mechanisms defined by Bluetooth standards. The Bluetooth transceivers 202f and 205a further support broadcast transport channels such as active broadcast and piconet broadcast.

The primary synchronous channel 206 is a Bluetooth link between the audio gateway 202 and the primary unit 203, with the master-to-slave and slave-to-master voice packets identified by the LT-ADDR of the primary unit 203. All the participating terminal units are synchronized to the audio gateway transmission slots of the primary synchronous channel 206 and can receive synchronous data sent from the audio gateway 202 to the primary unit 203. Transmission of synchronous data in the corresponding slave to master transmission slots of the primary synchronous channel 206 is available to an incumbent terminal unit. Any terminal unit can request the audio gateway 202 for the right to transmit through the primary synchronous channel 206. Such a request can be triggered either by a user initiated event such as the press of a button on the HMI or automatically based on voice activity detection, or the audio gateway 202 may periodically solicit such a request from the terminal units.

Figure 2B:
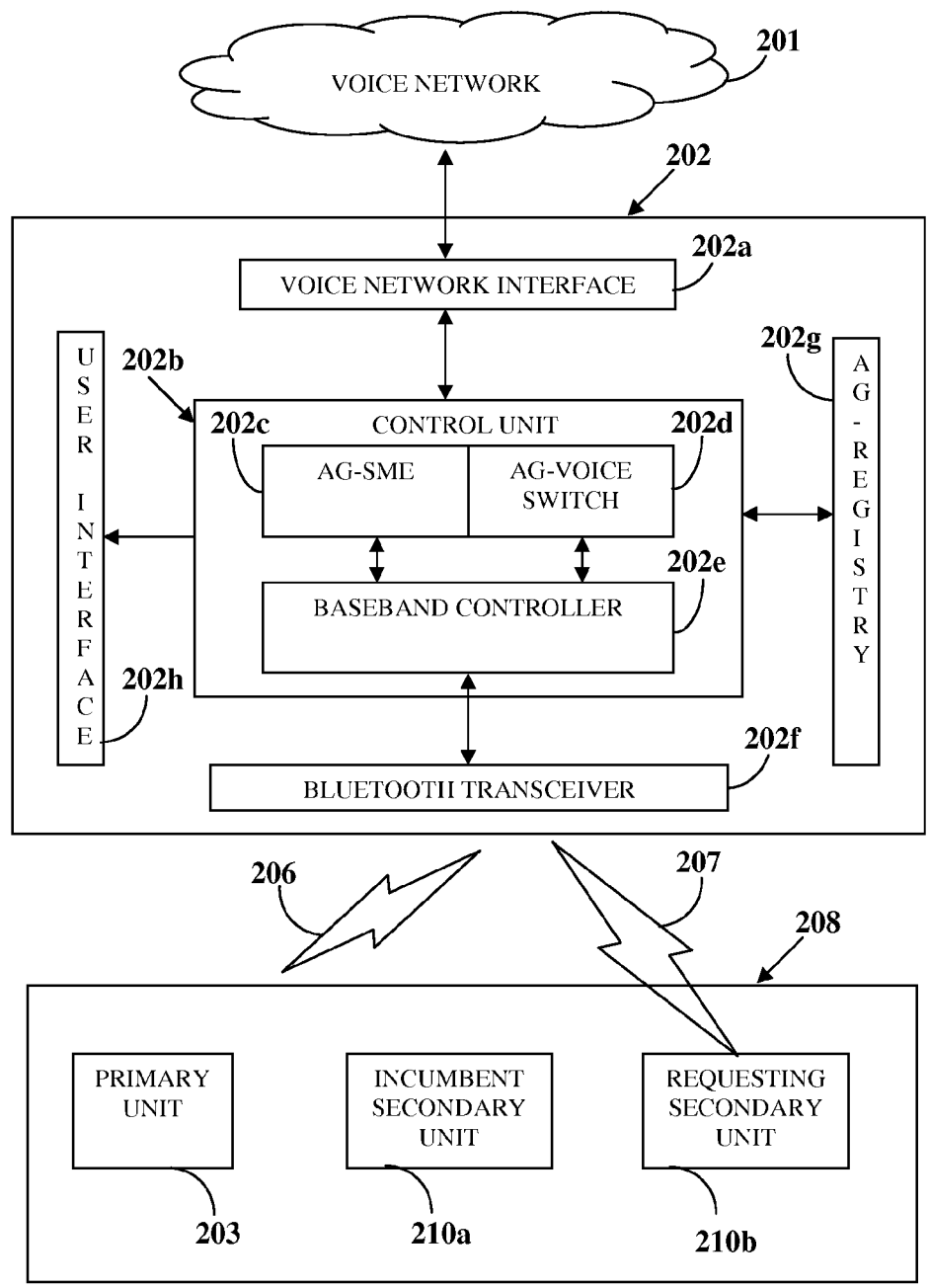
FIG. 2B exemplarily illustrates the communication between the audio gateway and the terminal units using a secondary synchronous channel.

FIG. 2B exemplarily illustrates the communication between the audio gateway and the terminal units using a secondary synchronous channel 207. If a request for microphone holder rights by a requesting secondary terminal unit 210b is accepted, the audio gateway 202 executes the microphone holder rights transfer routine illustrated in FIG. 3. The microphone holder rights are transferred from an incumbent terminal unit 210a to the requesting terminal unit 210b. In one embodiment of the invention, as mentioned earlier a secondary synchronous channel 207 is introduced between the Bluetooth enabled audio gateway 202 and the primary unit 203. The terminal units are synchronized on the slot trains of the secondary synchronous channel 207. The secondary synchronous channel 207 is used for the temporary transmission of voice packets from the requesting secondary terminal unit 210b to the audio gateway 202, when the microphone holder rights are not completely transferred to the requesting secondary terminal unit 210b. The audio gateway 202 has the audio gateway voice switch 202c for switching and mixing voice packets from the slave-to-master transmission slots of the primary synchronous channel 206 and the slave-to-master transmission slots of the secondary synchronous channel 204. When transfer procedures for the requesting terminal unit 210b are completed, the slave-to-master transmission on the secondary synchronous channel 207 is switched over to the primary synchronous channel 206. In one embodiment, the audio gateway 202 may utilize a voice activity detection mechanism for detecting voice activity in the secondary synchronous channel 207, and automatically initiate the microphone holder rights transfer procedure.

Terminal Unit Joining a Session:

Once a conferencing session is established between the audio gateway 202 and the Bluetooth enabled terminal units, timing parameters of the synchronous connection (Tsco) or the extended synchronous connection (Tesco) and packet type information are available to the control unit 202b of the audio gateway 202. The local conferencing set up is an optional mode of operation for the audio gateway 202 and the terminal units. This mode may be enabled or disabled through the appropriate human-machine interface (HMI) available to the terminal units, or may be configured as a default mode of operation for the audio gateway 202 and the terminal units.

When the local conferencing setup is enabled or established in a terminal unit 205, the TU-SME 205c is initiated in the terminal unit 205. The TU-SME 205c sets up an ACL channel with the AG-SME 202c using standard Logical Link Control and Adaptation Protocol (L2CAP) procedures of Bluetooth. This ACL channel is a secure connection using point-to-point PIN for authentication. Using this secure connection, the common session parameters are shared between the AG-SME 202c and the TU-SME 205c. The AG-SME 202c creates a record of the newly joined terminal unit 205 in the audio gateway registry 202a. This record maintains, among other things, an activity timer for the terminal unit 205. This activity timer is refreshed every time the terminal unit 205 requests for microphone holder rights.

The AG-SME 202c may instruct the TU-SME 205c to switch to the common link key for the session. The AG-SME 202c and TU-SME 205c use the common link key, and the common frequency hopping sequence (Adaptive Frequency Hopping Sequence), etc. for voice data communication. The TU-SME 205c on the terminal unit 205 then synchronizes to the synchronous slots being used for the session, using the information in the common session parameters.

In an embodiment of the invention, the AG-SME 202c may allow the newly joining terminal unit 205 to be the incumbent terminal unit 210a, so that the new participant can greet the other in-session participants and introduce itself. Alternatively the TU-SME 205c on the terminal unit 205 may inhibit transfer of voice packets to the return slots of the primary synchronous channel 206.

Terminal Unit Leaving the Session:

A secondary unit 204 leaving the session may send a message to the AG-SME 202c indicating dissociation from the conference. The transmission of the message may be triggered by a user interface action on the departing secondary unit 204. In another form, the message may be sent by the TU-SME 205c of the departing secondary unit 204 as an ACL packet acting as a slave. If the departing unit is the primary unit 203, the primary unit 203 will elect a new primary unit from among the secondary units. Further, the audio gateway 202 removes the record of the departed terminal unit from the audio gateway registry 202g and dissociates the departing unit from the AG-SME 202c using L2CAP packets defined for local conferencing session using Bluetooth.

The termination of a conferencing session is initiated by the audio gateway session management entity 202d based on (a) a user interface action on the primary terminal unit 203, (b) termination of the network call, or (c) when all the terminal units have left the session. A conferencing session's termination results in the invalidation of common session parameters used in the session and resetting of the audio gateway registry 202a. After the termination of a session, the audio gateway 202 and the terminal units may operate in normal mode, until the next local session mode is initiated.

Terminal Unit Dropping Out During the Session:

A terminal unit may silently drop out of a session. Before dropping out, the terminal unit may have been in passive listening mode. At the AG-SME 202c, the activity timer for the terminal unit may have expired and the terminal unit would have been placed in park state. Normally such terminal units have no impact on the session. However, in an embodiment where it is important to detect terminal units that have dropped out, a heart-beat timer is used for each terminal unit at the AG-SME 202c. The AG-SME 202c may periodically send a heart-beat message to each terminal unit to which the terminal unit is expected to compulsorily respond. If a terminal unit does not respond, the terminal unit is considered to have dropped out of the session and the entry of the terminal unit in the registry 202g is released. The heart-beat packet is sent to active slaves, i.e. active terminal units, using standard point-to-point L2CAP. If a terminal unit is in parked state, link manager protocol data units (LM PDU) are sent to the parked terminal unit as master initiated 'unpark' request. The terminal unit is unparked and AG-SME 202c sends the heart-beat message to the unparked terminal unit. When the unparked terminal unit responds to the heart-beat message, the unparked terminal unit may be parked again either immediately or later.

If an incumbent secondary terminal unit 210a drops out of the session, the AG-SME 202c transfers the microphone holder rights to the primary terminal unit 203 unilaterally. The primary unit 203 may or may not be aware of this transfer as no communication of this transfer is made from the audio gateway 202 to the primary unit 203. This may result in silence in the unit-to-audio gateway side of transmissions until the primary terminal unit 203 or the secondary terminal units trigger a request for the microphone holder rights. Hence, in an embodiment, the AG-SME 202c and TU-SME 205c may enforce a limit on the period of ownership of the primary synchronous channel 206 by an incumbent secondary terminal unit 210a, after which the incumbent secondary terminal unit 210a must re-acquire ownership. If the maximum value of this period $T_{own}$ is less than a supervision timeout interval $L_{sup}$ for the Bluetooth link between the audio gateway 202 and the secondary terminal unit, then it can be ensured that a secondary terminal unit dropping out is not an incumbent terminal unit. That is, before the completion of the period $L_{sup}$ and at the end of $T_{own}$ the rights possessed by the incumbent secondary terminal unit 210a, is transferred back to the primary terminal unit 203.

In case the primary terminal unit 203 drops out of the session, the AG-SME 202c elects or nominates a new primary unit among the remaining terminal units. This results in the newly elected primary unit's LT-ADDR being used for all synchronous packets from that point in time.

Coordinated Usage of Synchronous Channel:

The audio gateway 202 transmits voice data from the AG-Voice-Switch 202d through the Bluetooth transceiver 202f, typically in the master transmit slot of the primary synchronous channel 206. All the slave terminal units which synchronize to this slot may receive the voice data. In a preferred embodiment, the terminal units in a local conferencing session listen to and deliver the packets addressed to the LT-ADDR. Even if a terminal unit is in the parked state, the terminal unit is allowed to synchronize and listen to the synchronous slot using a local control method invoked by the TU-SME 205c. The TU-SME of the incumbent or microphone holder terminal unit alone permits the transmission of voice data from the TU-audio-SW 205d into the return transmit slot of the primary synchronous channel 206 through the Bluetooth transceiver 205a. The TU-SME of a non-incumbent terminal unit prohibits the transmission in the slave-to-master transmit slot of the primary synchronous channel 206.

Request and Transfer of Microphone Holder Rights:

In one embodiment of the invention, the user may trigger a request for microphone holder right through the HMI 205e. In an alternative embodiment the TU-audio-SW 205d may be capable of detecting the voice activity of a user and automatically trigger a request for the microphone holder right. In both the embodiments the TU-SME 205c registers the events in the TU-store 205f and sends a MIC_REQUEST packet to the AG-SME 202c. The AG-SME 202c polls each active terminal unit using standard Bluetooth procedures through ACL-U packet, ACL-C packet, or POLL packet, during which the TU-SME 205c may send the MIC_REQUEST packet in the slave-transmit slot with the PARTICIPANT_ID of the requesting terminal unit.

When a secondary terminal unit 205 is in sniff mode, the sniff interval and window values are setup by the AG-SME 202c and TU-SME 205c such that during each sniff interval the AG-SME 202c polls the TU-SME 205c for soliciting a request. If the secondary unit 205 is in the parked state, then the AG-SME 202c utilizes a beacon slot or access window to poll the secondary terminal unit. If the TU-SME 205c of the parked terminal unit 205 has registered a trigger event for incumbent right request, the parked terminal unit 205 uses standard Bluetooth slave-initiated unpark methods to become active prior to the transfer of microphone holder rights. The audio gateways session management entity 202c determines whether another secondary terminal unit has to be placed in parked state in order to make the requesting parked terminal unit active. In an embodiment, the AG-SME 202c may allow 2 active slaves, i.e. active terminal units in the conferencing session. The primary terminal unit 203 and the current incumbent secondary terminal unit 210a may constitute the 2 active slaves. As a result, there is a possibility that any other requesting terminal unit 210b would have to be unparked before a microphone holder rights transfer is initiated. In such cases, the microphone holder rights are successfully transferred to the requesting terminal unit 210b while the previous incumbent terminal unit 210a is put into park state.

In another embodiment of the invention, the audio gateway registry 202g may keep track of the history of requests for incumbent rights by the secondary terminal units. Any terminal unit which has not requested for incumbent rights over a predefined period of time may be put into parked state. In yet another embodiment, a terminal unit may be put into parked state only when required to make a requesting terminal unit 210b active.

Figure 3:
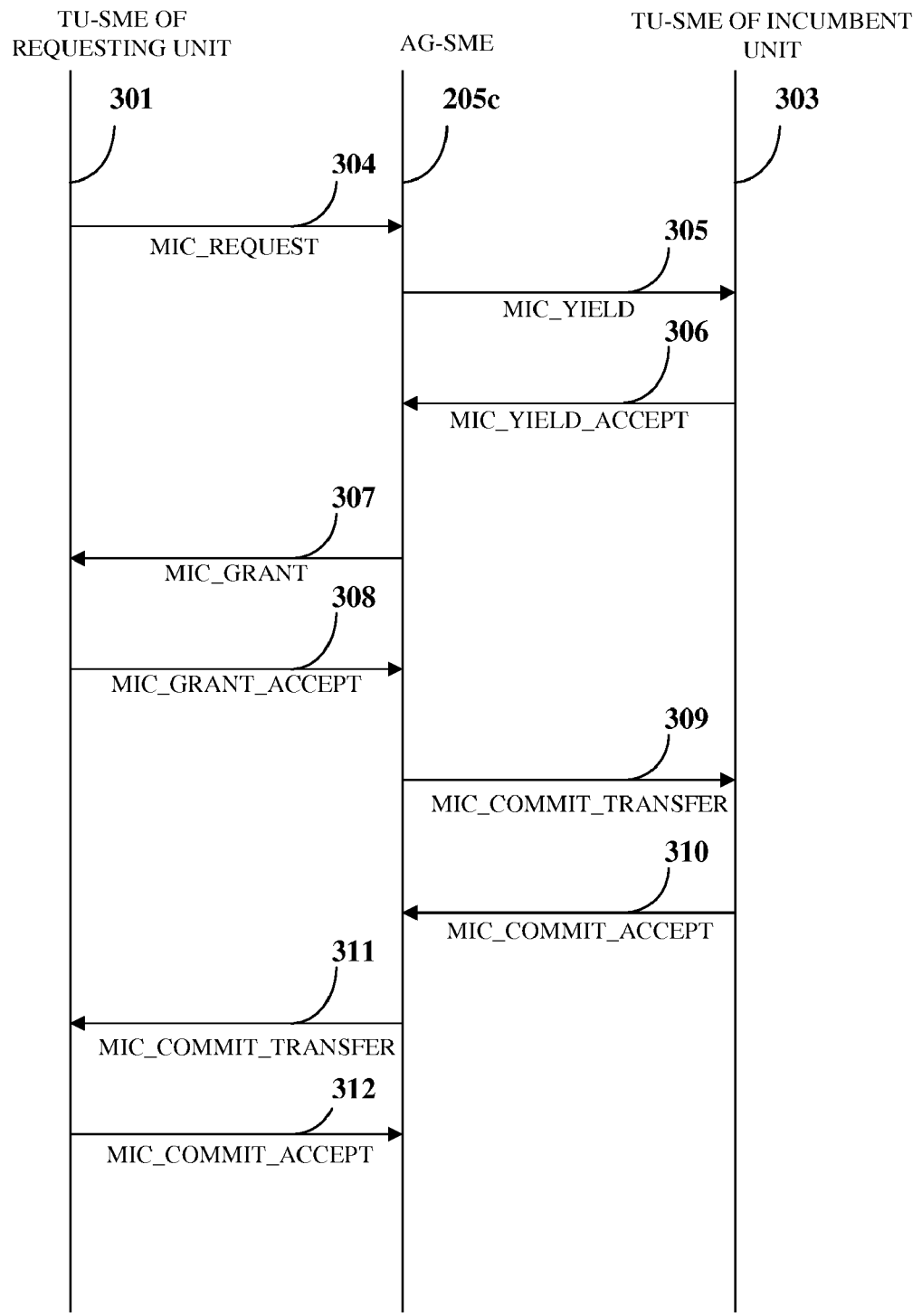
FIG. 3 is an exemplary message sequence chart illustrating the transfer of microphone holder rights from an incumbent terminal unit to a requesting terminal unit.

FIG. 3 is a message sequence chart illustrating the transfer of microphone holder rights from an incumbent terminal unit 210a to a requesting terminal unit 210b. The transfer of microphone holder rights is coordinated and accomplished by the audio gateway session management entity (AG-SME) 205c. The TU-SME 301 of the requesting unit 210b sends a MIC_REQUEST packet 304 to the AG-SME 205c. The AG-SME 205c upon receiving a MIC_REQUEST packet 304 decides whether or not the request can be allowed. If the request cannot be allowed, the AG-SME 205c sends a MIC_REQUEST_NOT_ACCEPTED packet with a 'reason' field indicating the reason for rejecting the request. If the request is accepted, the AG-SME 205c sends a MIC_YIELD packet 305 with the participant identification of the requesting terminal unit 210b to the TU-SME 303 of the incumbent terminal unit 210a. The TU-SME 303 of incumbent terminal unit 210a may respond with a MIC_YIELD ACCEPT packet 306 to the AG-SME 205c.

The AG-SME 205c sends a MIC_GRANT packet 307 with the participant identification of the yielding incumbent unit 210a to the TU-SME 301 of the requesting unit 210b. The TU-SME 301 of the requesting unit 210b will respond with a MIC_GRANT_ACCEPT packet 308. On receiving the MIC_GRANT_ACCEPT packet 308, the AG-SME 205c sends a MIC_COMMIT_TRANSFER packet 309 to the TU-SME 303 of incumbent terminal unit 210a. The incumbent unit 210a stops transmitting on the unit-to audio gateway slot of the synchronous channel and sends a MIC_COMMIT_ACCEPT packet to the AG-SME 205c. Similarly, the AG-SME 205c sends a MIC_COMMIT_TRANSFER packet 311 to the TU-SME 301 of the requesting unit 210b and accepts a MIC_COMMIT_ACCEPT packet 312 from TU-SME 301 of the requesting unit 210b, thereby completing the transfer of the microphone holder rights. From this point, the requesting terminal unit 210b can commence transmitting on the slave-to-master slots of the primary synchronous channel 206.

If the MIC_COMMIT_TRANSFER packet 309, from the audio gateway 202 to the incumbent terminal unit 210a, does not result in a return of MIC_COMMIT_ACCEPT packet 310 from the incumbent terminal unit 210a, then the transfer of microphone holder rights fails and the incumbent terminal unit 210a retains the microphone holder rights.

An alternate method for transfer of microphone holder rights is a 'delay optimized' method. In the delay optimized method, the transmission in the unit-to-audio gateway return slots of the primary synchronous channel 206 begins within a stipulated time after initiation of request by the requesting terminal unit 210b. This may result in temporary collisions of voice packets between incumbent terminal unit 210a and requesting terminal unit 210b. The requesting terminal unit 210b may start a timer. If the transfer of microphone holder rights completes before the expiry of the timer, the requesting terminal unit 210b continues transmitting. If the timer expires before the completion of transfer of microphone holder rights, the transmission of voice packets may be paused until the transfer is completed. If the temporary collisions are not acceptable, the requesting unit 210b may use the secondary synchronous channel 207 to transmit voice packets, until the transfer of microphone holder rights is completed.

In one embodiment of the invention, the AG-SME 202c of the audio gateway 202 may be absent. The TU-SME 205c of one of the terminal units may perform the function of the AG-SME 202c.

In an embodiment of the invention, a voice multiplexer is used at the audio gateway 202 for mixing voice data from the voice network and, voice data from the local conference session that is fed back to the participants and the voice network. The voice multiplexing in the audio gateway 202 may be used only when the incumbent terminal unit 210a is not physically present in the audible distance of the other participating terminal units. Otherwise, perceivable delay between direct audio path and feedback path may result in poorer user experience.

It will be readily apparent that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications.

Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method for establishing a local conferencing session amongst a plurality of Bluetooth enabled terminal units, comprising the steps of:
   providing a Bluetooth enabled audio gateway, wherein said Bluetooth enabled audio gateway transfers voice data between a voice network and said plurality of Bluetooth enabled terminal units;
   providing a terminal unit session management entity on each of the plurality of Bluetooth enabled terminal units;
   providing an audio gateway session management entity on the Bluetooth enabled audio gateway;
   providing a Bluetooth communication channel for transmitting Bluetooth packets between the Bluetooth enabled audio gateway and the plurality of Bluetooth enabled terminal units, wherein said Bluetooth communication channel is one of a synchronous channel and an asynchronous channel, wherein said synchronous channel is one of a primary synchronous channel and a secondary synchronous channel;
   establishing a local conferencing session setup prior to said local conferencing session, comprising the steps of:
      establishing a set of common session parameters on the Bluetooth enabled audio gateway, wherein said common session parameters enable Bluetooth communication between the plurality of Bluetooth enabled terminal units and the Bluetooth enabled audio gateway; and transmitting said set of common session parameters from said audio gateway session management entity to said terminal unit session management entity of each of the plurality of Bluetooth enabled terminal units;

coordinating the usage of said Bluetooth communication channel by the audio gateway session management entity and the terminal unit session management entity of each of the plurality of Bluetooth enabled terminal units, comprising the steps of:

broadcasting first voice packets from the voice network to each of the Bluetooth enabled terminal units via the Bluetooth enabled audio gateway; and permitting only one of the Bluetooth enabled terminal units to transmit second voice packets to the voice network via the Bluetooth enabled audio gateway, wherein said permitted terminal unit is provided with microphone holder rights for transmitting said second voice packets to the audio gateway over the primary synchronous channel on reverse voice path;

transferring said microphone holder rights from said permitted terminal unit to a requesting terminal unit by the audio gateway when said requesting terminal unit requests for said microphone holder rights;

transmitting said second voice packets from said requesting terminal unit to the audio gateway over said secondary synchronous channel during said transfer of said microphone holder rights to reduce time latency between a trigger for said request and voice transmission to said audio gateway.

2. The method of claim 1, wherein said set of common session parameters comprises a common personal identification number for authenticating the plurality of Bluetooth enabled terminal units.

3. The method of claim 1, wherein said set of common session parameters comprises a common frequency hopping technique used by the plurality of Bluetooth enabled terminal units and the Bluetooth enabled audio gateway.

4. The method of claim 1, wherein said set of common session parameters comprises definitions of types of said Bluetooth packets, wherein the Bluetooth packets are one of several control data packets and voice packets.

5. The method of claim 1, wherein said primary synchronous channel is used for broadcasting the first voice packets and the second voice packets.

6. The method of claim 1, wherein said Bluetooth asynchronous channel is used for broadcasting the first voice packets and the second voice packets.

7. The method of claim 1, wherein said set of common session parameters comprises an offset and duration for the Bluetooth synchronous channel.

8. The method of claim 1, wherein said set of common session parameters comprises a commonly defined air mode used for encoding said first voice packets and said second voice packets.

9. The method of claim 1, wherein said step of transmitting said set of common session parameters is via the asynchronous channel.

10. The method of claim 1, wherein said microphone holder rights are transferred from an incumbent terminal unit to a requesting terminal unit by the audio gateway session management entity.

11. The method of claim 10, wherein during said transfer of microphone holder rights, said requesting terminal unit transfers the second voice packets over the secondary synchronous channel, whereby time latency during the transfer is reduced.

12. The method of claim 1, wherein said permitted Bluetooth enabled terminal unit transmits said second voice packets over the Bluetooth asynchronous channel, wherein said permitted Bluetooth enabled terminal unit is provided with microphone holder rights.

13. The method of claim 12, wherein said permitted Bluetooth enabled terminal unit is polled by the audio gateway session management entity for facilitating said transmission of the second voice packets over the Bluetooth asynchronous channel.

14. The method of claim 1, wherein said set of common session parameters are invalidated when said local conferencing session is terminated.

15. The method of claim 1, wherein said audio gateway session management entity manages a record of the plurality of Bluetooth enabled terminal units participating in said local conferencing session.

16. A system for establishing a local conferencing session amongst a plurality of Bluetooth enabled terminal units, comprising:

a Bluetooth enabled audio gateway for providing a wireless interconnect between a voice network and said plurality of Bluetooth enabled terminal units, comprising:

an audio gateway session management entity configured for:

sharing a set of common session parameters to the plurality of Bluetooth enabled terminal units, wherein said common session parameters enable Bluetooth communication between the plurality of Bluetooth enabled terminal units and the Bluetooth enabled audio gateway;

and transferring microphone holder rights from a permitted terminal unit to a requesting terminal unit by the audio gateway when said requesting terminal unit requests for microphone holder rights, wherein said permitted terminal unit is provided with microphone holder rights for transmitting said second voice packets to the audio gateway over a primary synchronous channel;

an audio gateway registry for storing said set of common session parameters and participant information of the plurality of Bluetooth enabled terminal units;

an audio gateway voice switch for providing a Bluetooth communication channel for routing voice packets between said voice network and the plurality of Bluetooth enabled terminal units, wherein said Bluetooth communication channel is one of a synchronous channel and an asynchronous channel, wherein said synchronous channel is one of said primary synchronous channel and a secondary synchronous channel;

each of said plurality of Bluetooth enabled terminal units comprising:

a terminal unit session management entity for enabling said Bluetooth enabled terminal unit to participate in said local conferencing session using the set of common session parameters;

said secondary synchronous channel for transmitting voice packets from said requesting terminal unit to the Bluetooth enabled audio gateway during said transfer of microphone holder rights to reduce time latency between a trigger for said request and voice transmission to said audio gateway.

17. The system of claim 16, wherein each of said plurality of Bluetooth enabled terminal units comprises a storage means for registering a user's human machine interface events.

18. The system of claim 16, wherein said Bluetooth audio gateway comprises a voice network interface for connecting to said voice network.

19. The system of claim 16, further comprises a Bluetooth communication channel for transferring Bluetooth packets between the audio gateway and the plurality of Bluetooth enabled terminal units, wherein said Bluetooth packet is one of a voice packet and a control data packet.

20. The system of claim 19, wherein said Bluetooth communication channel is one of a synchronous channel and an asynchronous channel.

21. The system of claim 16, wherein said set of common session parameters comprises a common authentication personal identification number, standard voice packet types, offsets and a duration for said Bluetooth synchronous communication channel.

22. The system of claim 16, wherein said participant information comprises a record of the participating Bluetooth enabled terminal units and the identity of the permitted Bluetooth enabled terminal unit.

23. The system of claim 20, wherein said synchronous channel wirelessly connects the Bluetooth enabled audio gateway and the plurality of Bluetooth enabled terminal units.

24. The system of claim 23, wherein said synchronous channel comprises a primary synchronous channel used for transmitting voice packets between the plurality of Bluetooth enabled terminal units and the Bluetooth enabled audio gateway.

25. A computer program product comprising computer executable instructions embodied in a non-transitory computer readable medium, said computer program product comprising:
- a first computer parsable program code for establishing a local conferencing session setup prior to initializing a local conferencing session amongst a plurality of Bluetooth enabled terminal units comprising:
  - a second computer parsable program code for establishing a set of common session parameters on a Bluetooth enabled audio gateway; and
  - a third computer parsable program code for transmitting said set of common session parameters from an audio gateway session management entity of said Bluetooth enabled audio gateway to a terminal unit session management entity of each of said plurality of Bluetooth enabled terminal units;
- a fourth computer parsable program code for coordinating the usage of a Bluetooth communication channel between the Bluetooth enabled audio gateway and the plurality of Bluetooth enabled terminal units, comprising:
  - a fifth computer parsable program code for broadcasting first voice packets from the Bluetooth enabled audio gateway voice network to each of the Bluetooth enabled terminal units; and
  - a sixth computer parsable program code for permitting only one of the Bluetooth enabled terminal units to transmit second voice packets to the Bluetooth enabled audio gateway, wherein said permitted terminal unit is provided with microphone holder rights for transmitting said second voice packets to the audio gateway over a primary synchronous channel;
  - a seventh computer parsable program code for transferring said microphone holder rights from said permitted terminal unit to a requesting terminal unit by the audio gateway when said requesting terminal unit requests for microphone holder rights;
  - a eighth computer parsable program code for transmitting said second voice packets from said requesting terminal unit to the audio gateway over a secondary synchronous channel during said transfer of said microphone holder rights to reduce time latency between a trigger for said request and voice transmission to said audio gateway.

* * * * *